United States Patent [19]

Hoag et al.

[11] Patent Number: 5,105,538
[45] Date of Patent: Apr. 21, 1992

[54] LOW-COST METHOD OF MAKING CRACKED CONNECTING RODS COMPRISED OF FORGED WROUGHT STEEL

[75] Inventors: Peter Y. Hoag, Romeo; Ralph L. Kyte, Almont; Joel P. Stueck, Lapeer, all of Mich.

[73] Assignee: Ford Motor Company, Dearborn, Mich.

[21] Appl. No.: 678,928

[22] Filed: Apr. 1, 1991

[51] Int. Cl.$^5$ ............................................. B23P 15/10
[52] U.S. Cl. ................................................. 29/888.09
[58] Field of Search ................... 29/888.09, 888.091, 29/888.092; 411/274, 275

[56] References Cited

U.S. PATENT DOCUMENTS

| | | |
|---|---|---|
| 1,831,325 | 1/1926 | Short . |
| 2,371,400 | 5/1942 | Mantle . |
| 2,553,935 | 5/1951 | Parks et al. . |
| 3,195,599 | 7/1965 | Brook ............................. 411/275 |
| 3,994,054 | 11/1976 | Cuddon-Fletcher et al. . |
| 4,569,109 | 2/1986 | Fetouh . |
| 4,693,139 | 9/1987 | Mukai et al. . |
| 4,768,694 | 9/1988 | Fabris et al. . |
| 4,836,044 | 1/1989 | Löbig ......................... 29/888.09 X |
| 4,860,419 | 8/1989 | Hekman . |
| 4,900,179 | 2/1990 | Kundert ........................ 411/275 X |
| 4,936,163 | 6/1990 | Hoag et al. ................. 29/888.09 X |
| 4,970,783 | 11/1990 | Olaniran et al. ............... 29/888.09 |
| 4,993,134 | 2/1991 | Hoag et al. ................. 29/888.09 X |

OTHER PUBLICATIONS

Connecting Rods Are Cracked to Perfection, *Machine Design*, Mar. 10, 1988.

*Primary Examiner*—Timothy V. Eley
*Assistant Examiner*—C. Richard Martin
*Attorney, Agent, or Firm*—Joseph W. Malleck; Clifford L. Sadler

[57] ABSTRACT

Method of making exactly remateable cracked connecting rods comprised of forged wrought steel possessing typical ductility, said rods having a big end with a big bore therein and an arm-like body extending therefrom with a small end at its extremity, the big end having crack initiating crevices formed therein to promote a cracking plane, comprising the following steps: (a) placing the big bore of an uncracked connecting rod onto a nestable separable pair of cantilevered hemispherical blocks complementary to the internal shape of the big bore; (b) continuously and uniformly separating the cantilevers of said blocks to initially assure contact of said blocks with the rod at a tangent point aligned substantially on the longitudinal axis of the uncracked connecting rod, and thereafter to exert sufficient force through said cantilevers to the blocks to pull apart the connecting rod at the cracking plane determined by said crack initiating crevices, the connecting rod cap and body being free to experience small but independent macro-rotation relative to the connecting rod axis during such cracking separation.

19 Claims, 9 Drawing Sheets

LOW-COST METHOD OF MAKING CRACKED CONNECTING RODS COMPRISED OF FORGED WROUGHT STEEL

BACKGROUND OF THE INVENTION

1. Technical Field

This invention relates to the art of making bipartite connecting rods by cracking, and more particularly doing so with a forged wrought steel connecting rod possessing typical ductility.

2. Discussion of the Prior Art

Connecting rods have been made bipartite for some time by sawing the enlarged end of the connecting rod into two pieces and reassembling the sawed pieces with bolts (see U.S. Pat. Nos. 1,831,325 and 2,371,400). Fracturing is a more attractive alternative because it allows the irregular jagged ridges on the cracked plane to facilitate more exact rematching of the pieces. One of the earliest patented approaches to cracking forged wrought steel rods is disclosed in U.S. Pat. No. 2,553,935 (to Parks et al, 1951). The steel used for connecting rod in the 1940's was tough and ductile. To encourage cracking of such wrought steel, the cross-sectional area of the cracking plane was reduced by Parks with saw kerfs and drilled holes. This avoided using heat treatment to make the steel more brittle, which heat treatment would discourage ease of subsequent finish machining and would degrade the toughness of the connecting rod. This also avoided use of other brittlyzing techniques, such as cryogenics, which is exorbitantly expensive. An extension of the Parks idea of reducing the cross-sectional area is also shown in the later U.S. Pat. No. 4,693,139, employing dual V-notches to make the initiation of cracks easier.

The Parks patent, as well as U.S. Pat. Nos. 4,569,109; 4,768,694; and 4,860,419, have used a mode of cracking that employs a mandrel placed in the big bore of the connecting rod; the mandrel is expanded by forcing a wedge sideways therethrough. Wedge expandable mandrel cracking is disadvantageous because it is difficult to control cracking uniformity and lacks repeatability of quality when processing large volumes of connecting rods. Slight material variations or dimensional discrepancies between rods will require a slightly different wedge or stroke of the wedge to achieve uniformity. Such control of the wedge cannot be easily obtained.

Application of a cracking force has been tried in other modes, such as in U.S. Pat. No. 3,994,054, wherein conical members were thrust into smaller but separate openings drilled transversely through the cracking plane of the connecting rod. This mode resulted in uncontrolled cracking since the greatest force would occur unevenly on the side of the connecting rod where the conical members first entered the openings.

What is needed is a reliable method of consistently making excellently balanced and smoothly cracked connecting rods with the method operating on a one-piece forged wrought steel connecting rod possessing typical ductility and which method eliminates the need for any brittlyzing techniques.

SUMMARY OF THE INVENTION

The invention is a low-cost method of making cracked connecting rods comprised of forged wrought steel possessing typical ductility. The process comprises, in its most essential aspects, the following steps: (a) placing the big bore of a connecting rod onto a nestable pair of cantilevered hemispherical blocks complementary to the internal shape of the big bore; (b) continuously and uniformly separating the cantilevers of said blocks to initially assure contact of said blocks at a tangent point aligned substantially on the longitudinal axis of the connecting rod, and thereafter to exert sufficient force through said cantilevers to the blocks to pull apart the connecting rod at a cracking plane determined by crack initiating crevices in the connecting rod, the connecting rod cap and body being free to experience small but independent macro-rotation relative to the connecting rod axis during such cracking separation.

To facilitate balanced separating forces within the connecting rod while continuously pulling the cap and body apart, the cracking head apparatus, used to carry out step (b), is: (i) oriented to pull in a generally vertical plane, (ii) the longitudinal axis of the connecting rod is canted (in the range of 0.05°–0.15°) to compensate for stretch or deflection of a movable cantilever; (iii) the rod is completely suspended on the cantilevered blocks just prior to initiating cracking; (iv) the relative macro-rotation may preferably be limited by positioning shoulder stops adjacent the cap within a distance of 0.02–0.04 inch and a cradle spaced from the small end of the rod within a distance of 0.02–0.04 inch; and (v) one of the blocks is desirably held fixed while the other is moved for separation.

A transfer fixture may be used to position the connecting rod onto the cracking head cantilevered blocks, which fixture desirably carries away the split rod pieces in mated position for subsequent operations such as finish machining and reassembly. The transfer fixture advantageously uses resilient snugging contacts which offer little or no resistance to cracking forces.

The force used to create tension and resulting fracture in the connecting rod is preferably in the range of 35,000–45-000 pounds, applied at the rate of about 4.5 inches/second, and is administered preferably by a hydraulic piston and cylinder assembly.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION AND BEST MODE

Figure 1:
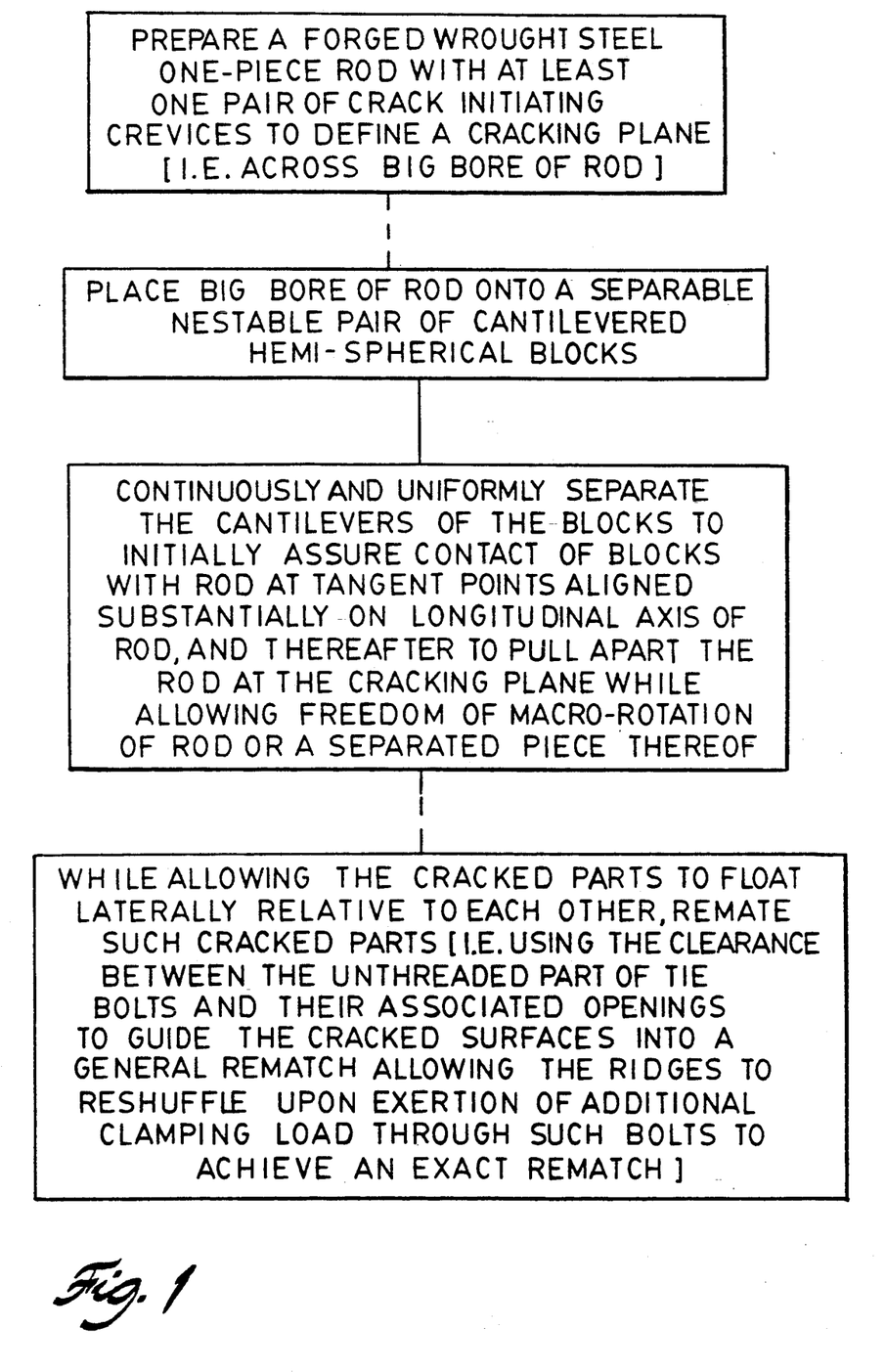
FIG. 1 is a block diagram of a preferred process mode of this invention.

A preferred process mode for carrying out the invention is depicted in the flow diagram of FIG. 1. The process is designed to make possible the cracking of wrought steel connecting rods, having typical ductility, with clean and level cracking planes that are exactly rematchable. Forging steels used for commercial connecting rods for the past several decades have generally included designations of 1151, 1141, and 1541. These steels are typically characterized as being "ductile". This level of ductility has normally led to stretching or deformation at the cracking plane during cracking unless such ductility characteristic is modified prior thereto by heat treatment or cryogenics as taught by U.S. Pat. No. 4,569,109.

Figure 2:
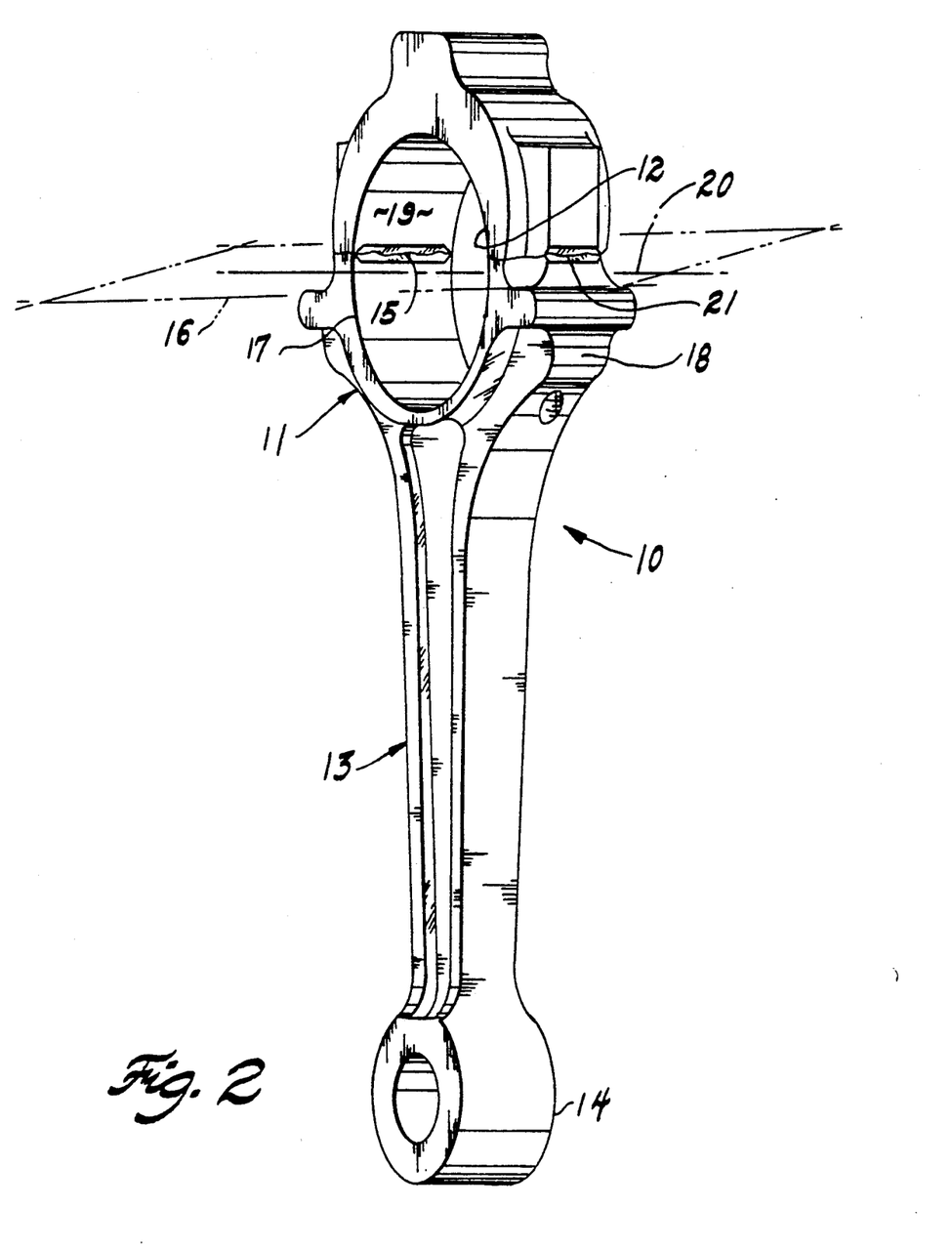
FIG. 2 is a perspective view of a forged one-piece connecting rod prepared for cracking.

The one-piece forged wrought steel connecting rod 10 has a big end 11 with a big bore 12 therein and an arm-like body 13 extending therefrom which terminates in a small end 14 at its extremity. The rod 10 is prepared with at least one pair of crack initiating crevices 15 to define a cracking plane 16 through the sides 17, 18 of the big end 11 and across the big bore 12 of the rod. The crevices are sharp V-shaped grooves that are machined (such as by broaching) into the internal surface 19 of the big bore, extending parallel to the axis 20 of the big bore. Sometimes it is desirable to provide an additional pair of external grooves 21 to control the line of cleavage thereat, such grooves also being sharply V-notched and parallel to the big bore axis. Such crevices may be more pronounced or sharp by originally forming them in the blank (to a degree slightly deeper than possible with machining) from which the rod is forged and then, during forging, closing the crevices by folding them over under pressure.

Figure 3:
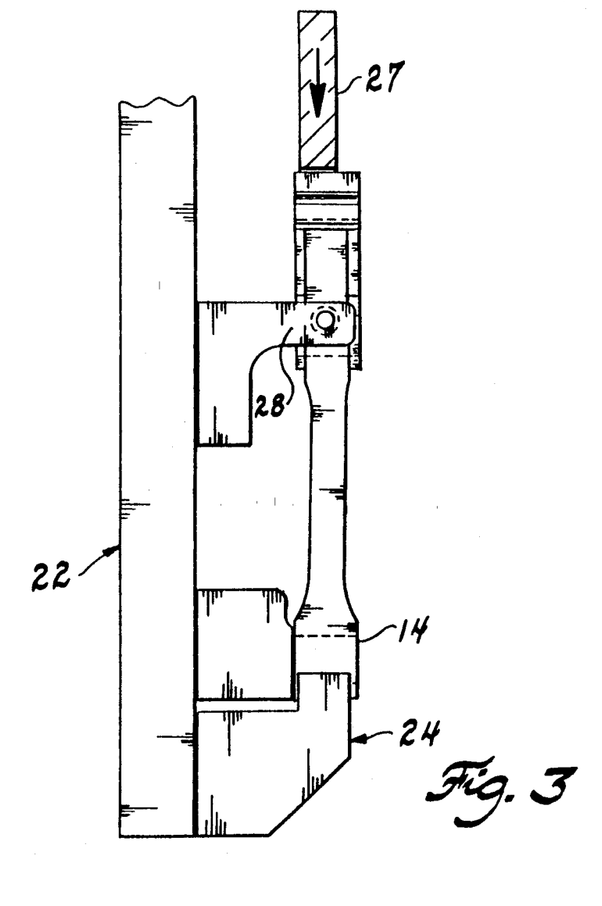
FIGS. 3–14 are sequential operative views of front and side elevations of the apparatus used to carry out the method of this invention.
Figure 4:
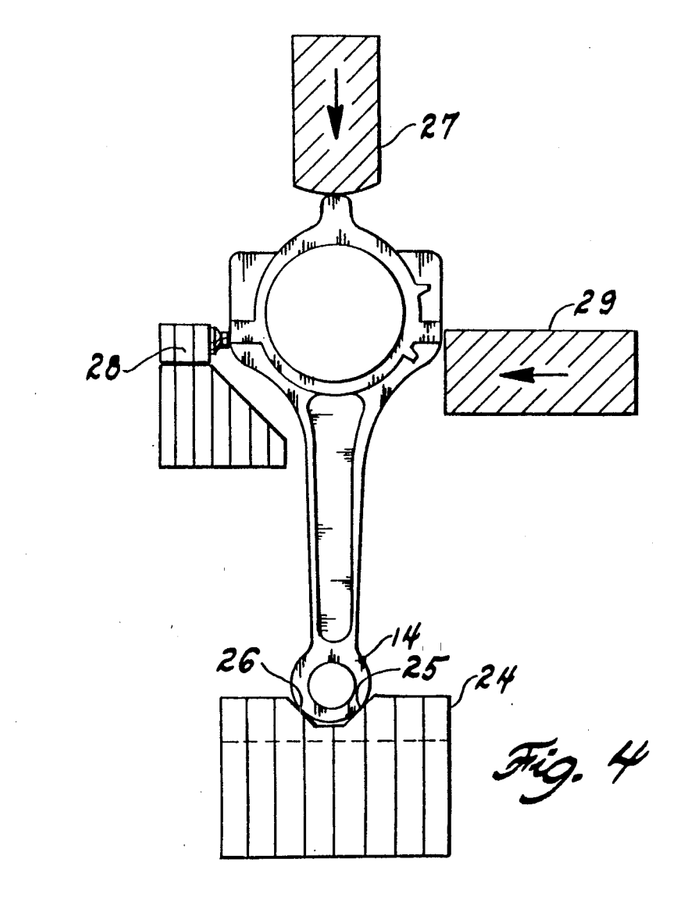

In further preparation, the one-piece connecting rod is manually placed onto an upright transfer fixture 22 that has been brought to a station across from a cracking head (see FIGS. 3 and 4, as phase 1). The transfer fixture serves not only to station the connecting rod in a stationary position in preparation for cracking, but is subsequently used to carry the rod along a carousel to permit other rod operations, including finish machining and reassembly. The transfer fixture has a cradle 24 comprised of biased right and left surfaces 25, 26 to support the small end 14 or bottom of the connecting rod during the preparatory or transfer stages. A resilient stop (crowder) 27 is brought down onto the top of the rod to snug the rod against the cradle 24. A pair of lateral supports 28, 29 are used to resiliently hold the midsection of the connecting rod, support (crowder) 29 being actuatable to resiliently contact the connecting rod to snug it against fixed support 28.

Figure 5:
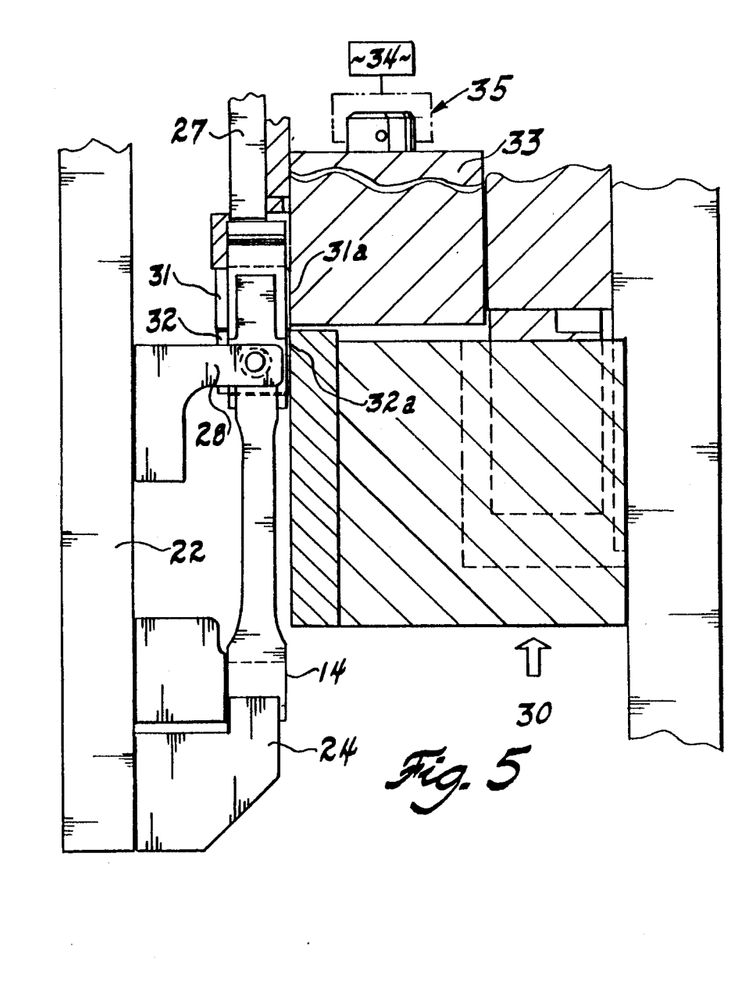
Figure 6:
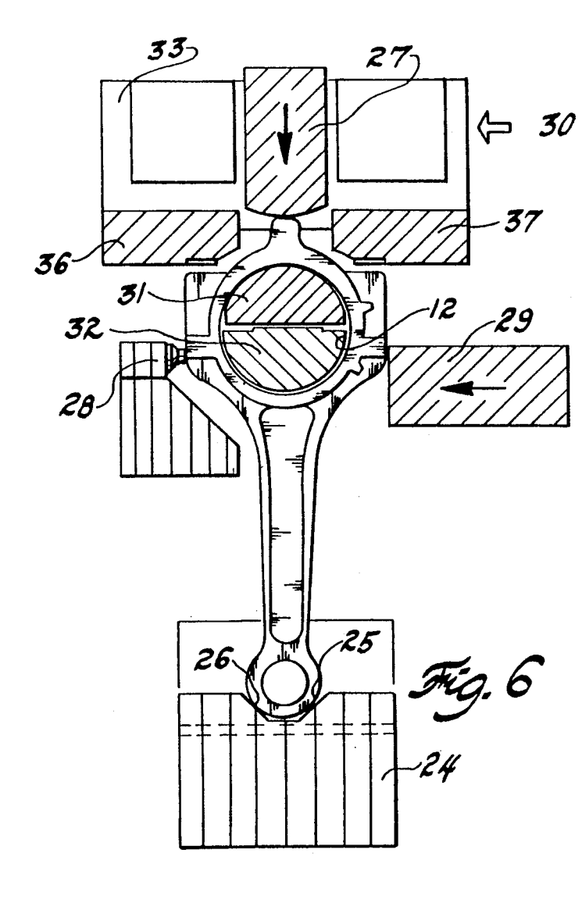

As shown in FIGS. 5 and 6, cracking head 30 is moved laterally up to fixture 22 to allow insertion into the big bore of the connecting rod a pair of nestable, vertically separable hemispherical blocks 31, 32, each of which is cantilevered at 31a, 32a, respectively, by integral attachment to a slide assembly 33 which in turn is actuated by a hydraulic piston and cylinder device 34 acting through connection 35. The hemispherical blocks 31, 32 are nested within the big bore 12 of the rod which in turn is nested within the crowder 27, cradle 24, and lateral supports 28, 29. Rod cap shoulder stops 36, 37 are carried by the cracking head 30, also as cantilevers, and interleave with the fixture nesting elements (crowder 24, supports 28, 29), but in spaced relation to the rod. The machine head 30 has a fixed assembly 38 connected by a cantilever with the lower hemispherical block 32. The vertically movable slide assembly 33 supports the upper cantilevered block 31 for applying tension force to the rod. The blocks, prior to hydraulic separation, are slightly smaller than the internal diameter of the rod bore 12 with a radial spacing on each side of about 0.007 inch (0.178 mm). The cracking head initially separates the blocks to pick up such 0.007 inch slack. After taking up such internal slack, the connecting rod will be raised and removed from any contact with the fixture cradle 24 at its small end 14; the lateral support 27 is resilient and offers little or no restraint against movement due to cracking action since the spring force does not exceed 30 pounds. Similarly, the top snugging crowder 27 offers a resilient force no greater than 33 pounds.

Figure 7:
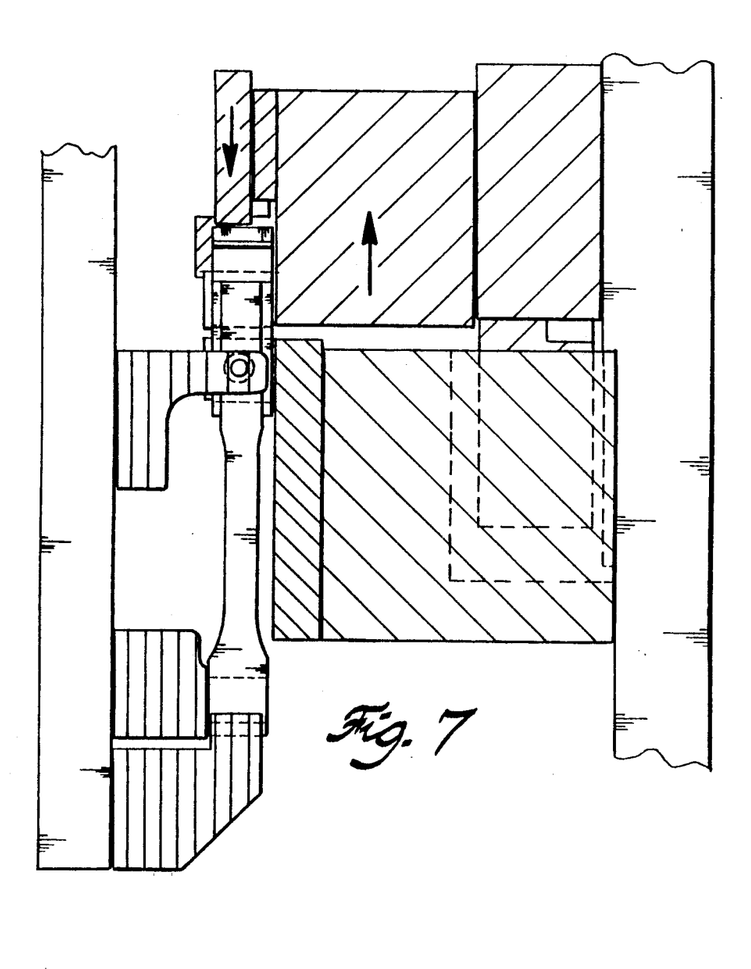
Figure 8:
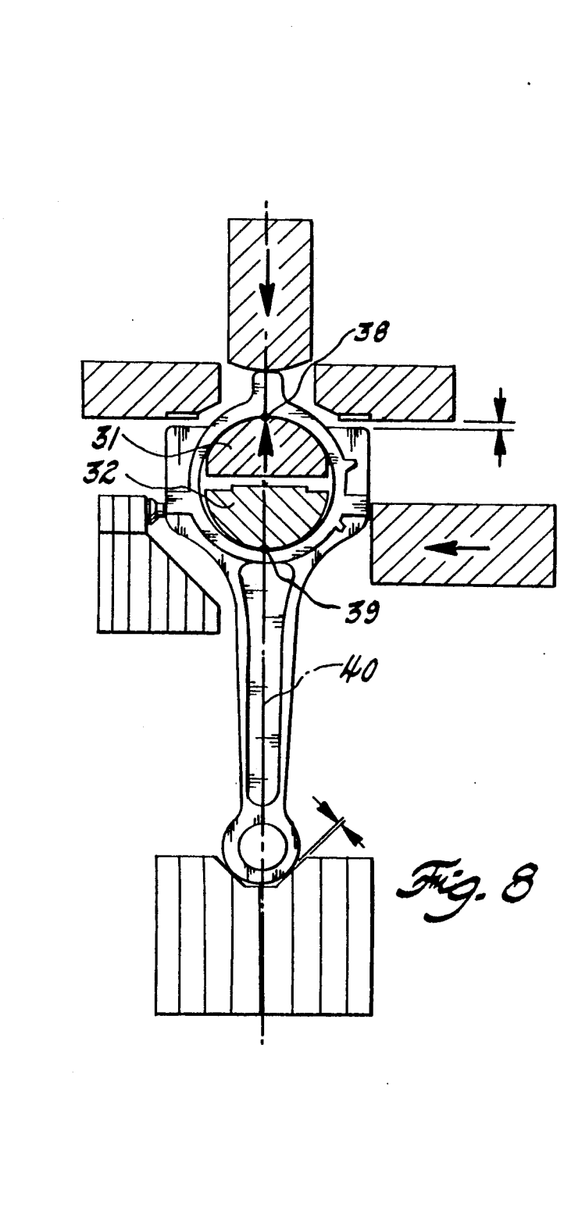

The cap shoulder stops 36, 37 on the cracking head 30 are spaced at least 0.02, inch from any part of the connecting rod. This is considerably greater than any machining tolerance. Thus, the connecting rod will be virtually suspended at tangential contact points 38, 39 of the hemispherical blocks (aligned with the longitudinal axis 40 of the rod) and there is no other restraining or solid contact maintained with the fixture or with the cracking head (see FIGS. 7 and 8). To commence cracking, the lower block 32 is held stationary while the upper block 31 is moved hydraulically uniformly upwardly and continuously by actuation of the piston and cylinder 34. The cantilevered upper block 31 is moved upwardly at a rate of about 4.5 inches/second to apply a pulling force of about 35,000–45,000 pounds. The slack is taken up in a first phase to suspend the rod on the tangential contact points of the blocks, free of fixture 22. As the pulling force continues, the bore opening will begin to be slightly stretched by such continued force, but only along the longitudinal axis of the rod, causing a somewhat greater surface of the block to engage the internal bore 12 of the rod.

Figure 9:
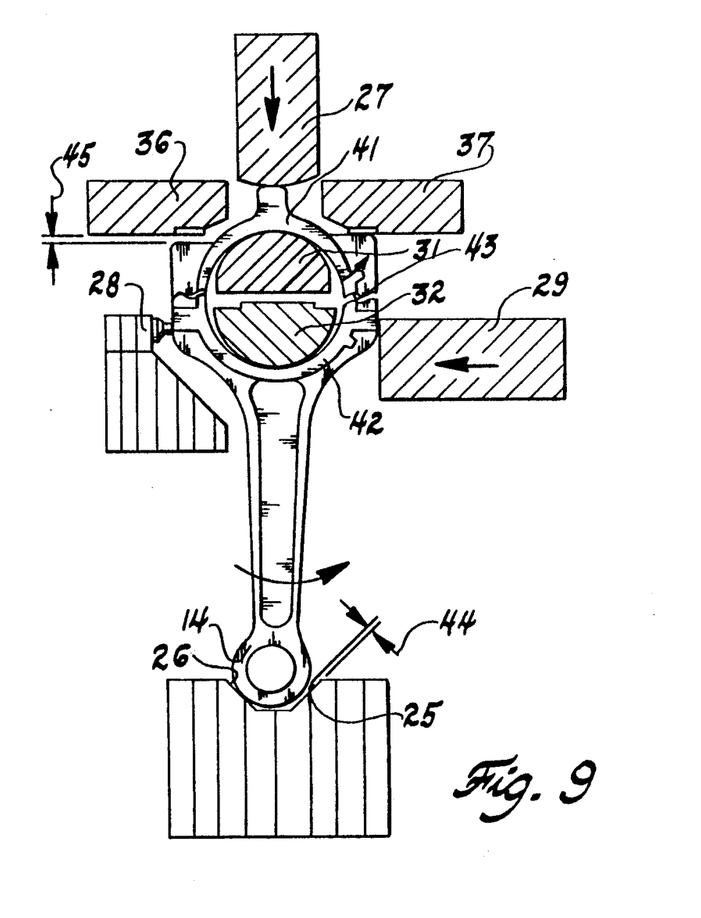
Figure 10:
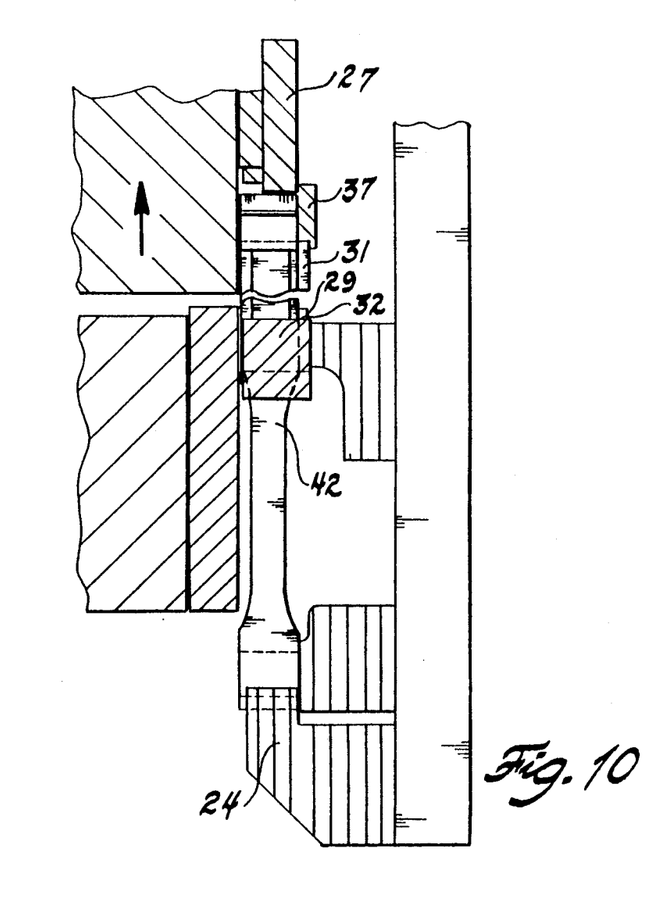

A crack is initiated at the crevices 15 and progresses along the crack plane 16 upon sustained tension from the cantilevered blocks because the cap 41 and body portion 42 portions of the rod are permitted freedom for small macro-rotation relative to each other during such cracking. This will promote a fishtailing effect where, upon severance of one side, the cap and body portions will rotate away from each other using the non-severed side as a pivot (see FIGS. 9 and 10). For example, the fishtailing may be to the left with the small end 14 contacting the left side 26 of the cradle 24 while the right side of the rod is cracked at 43 and the cap 41 rotated to the shoulder stop 37. A space of at least 0.02 inch (preferably 0.02–0.04 inch) is maintained at 44 between the cradle surface 25 and the rod end 14, and of at least 0.02 inch (preferably 0.02–0.04 inch) at 45 between the rod's left shoulder and shoulder stop 36.

Figure 11:
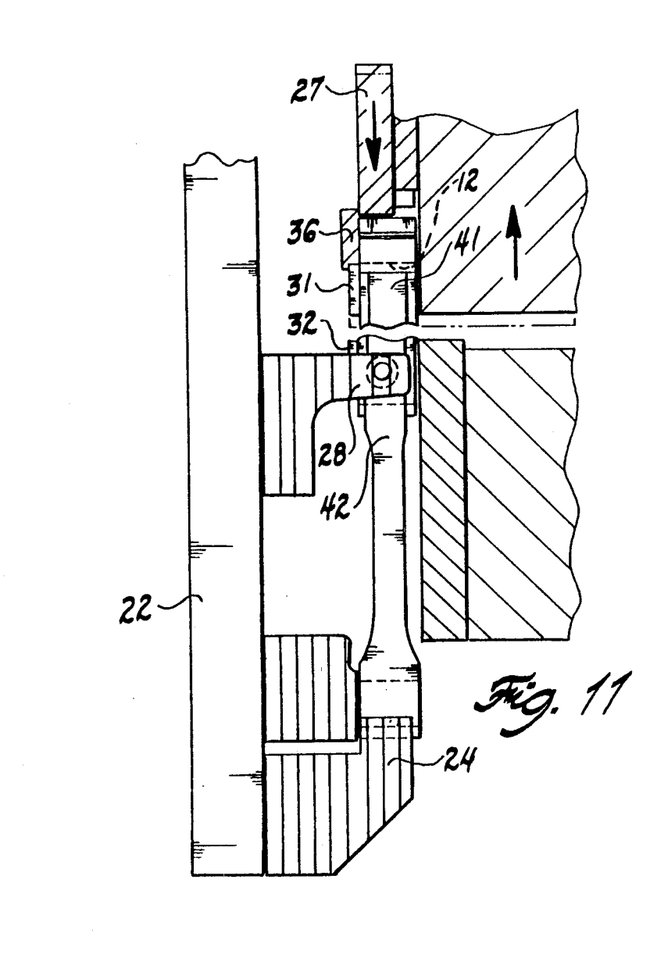
Figure 12:
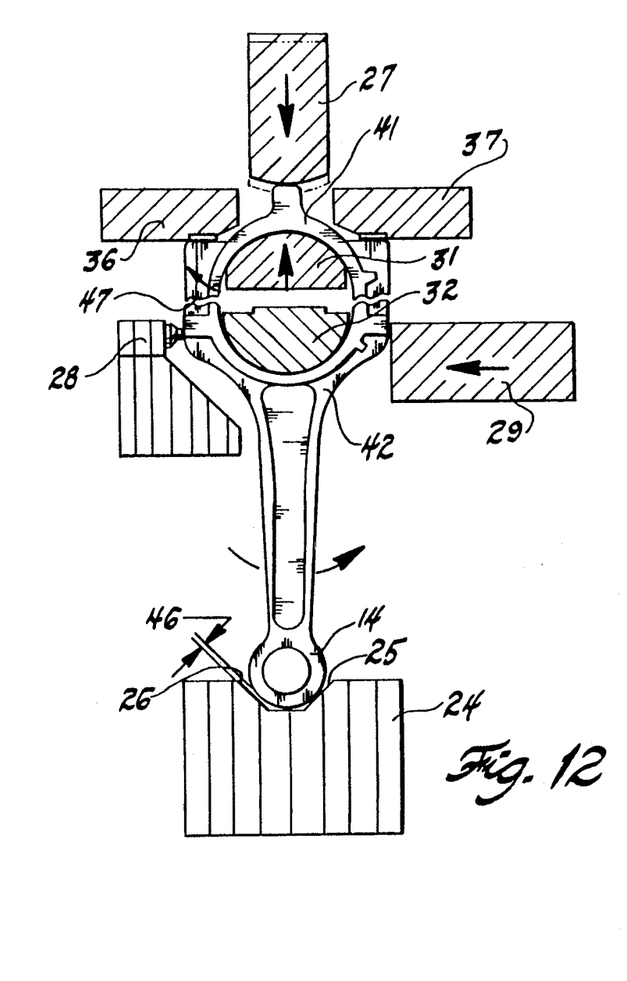

In the final cracking phase, the body portion 42 of the rod fishtails to the right contacting the right side 25 of the cradle 24, and the left side of the rod is cracked as the cap portion 41 is pulled further upwardly by the cantilevered block 31 and pivots about the stop 37.

Figure 13:
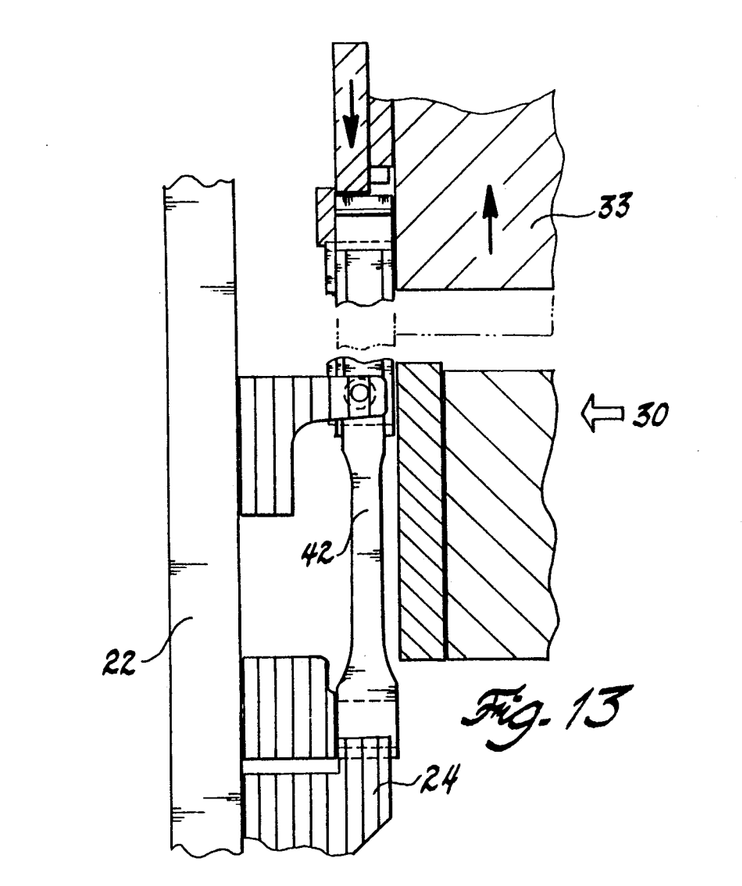
Figure 14:
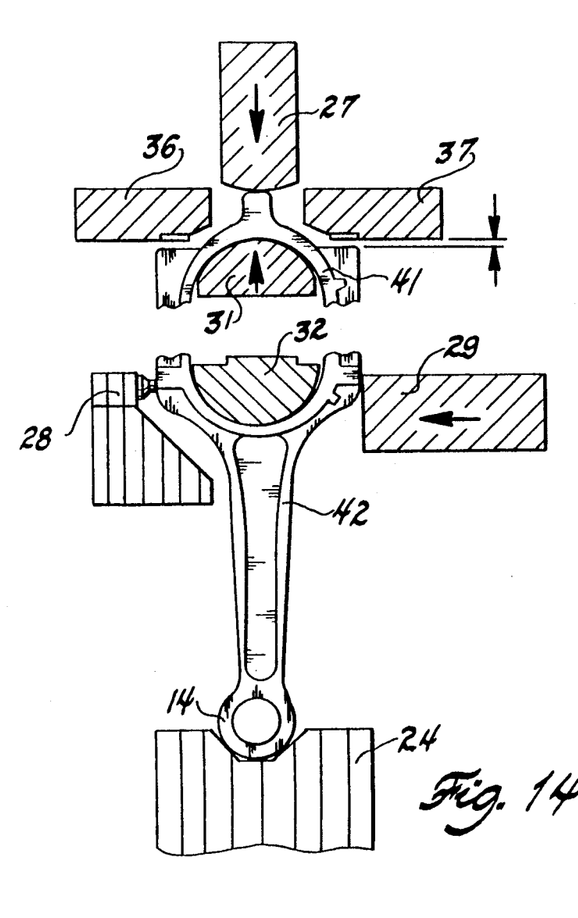

In one of the last phases, the loose body portion 42 of the connecting rod falls down into the cradle 24 (see FIGS. 13 and 14) and, subsequently, the cap portion 41 is lowered to rest on the cracked surface of the rod body portion 42 while the cracking head 30 is withdrawn from the connecting rod big bore.

Due to the large tension force (energy) that must be applied gradually and uniformly (i.e., 40,000 pounds at a movement rate of about 4.5 inches/second) to effect clean cracking, the movable cantilever may stretch or bend a micro-amount, angularly opposite to the direction of pulling. This may result in non-flat cracking or inability of the crack to follow the intended crack plane smoothly. This is overcome by canting of the cantilever of the movable block 31 a micro-degree in the direction of pulling (or away from the anticipated deflection of the cantilever during separation). Such canting may be in the range of 0.05°–0.1° for 1080 steel, but will depend on the nature of the material.

Figures 15, 16, 17, 18:
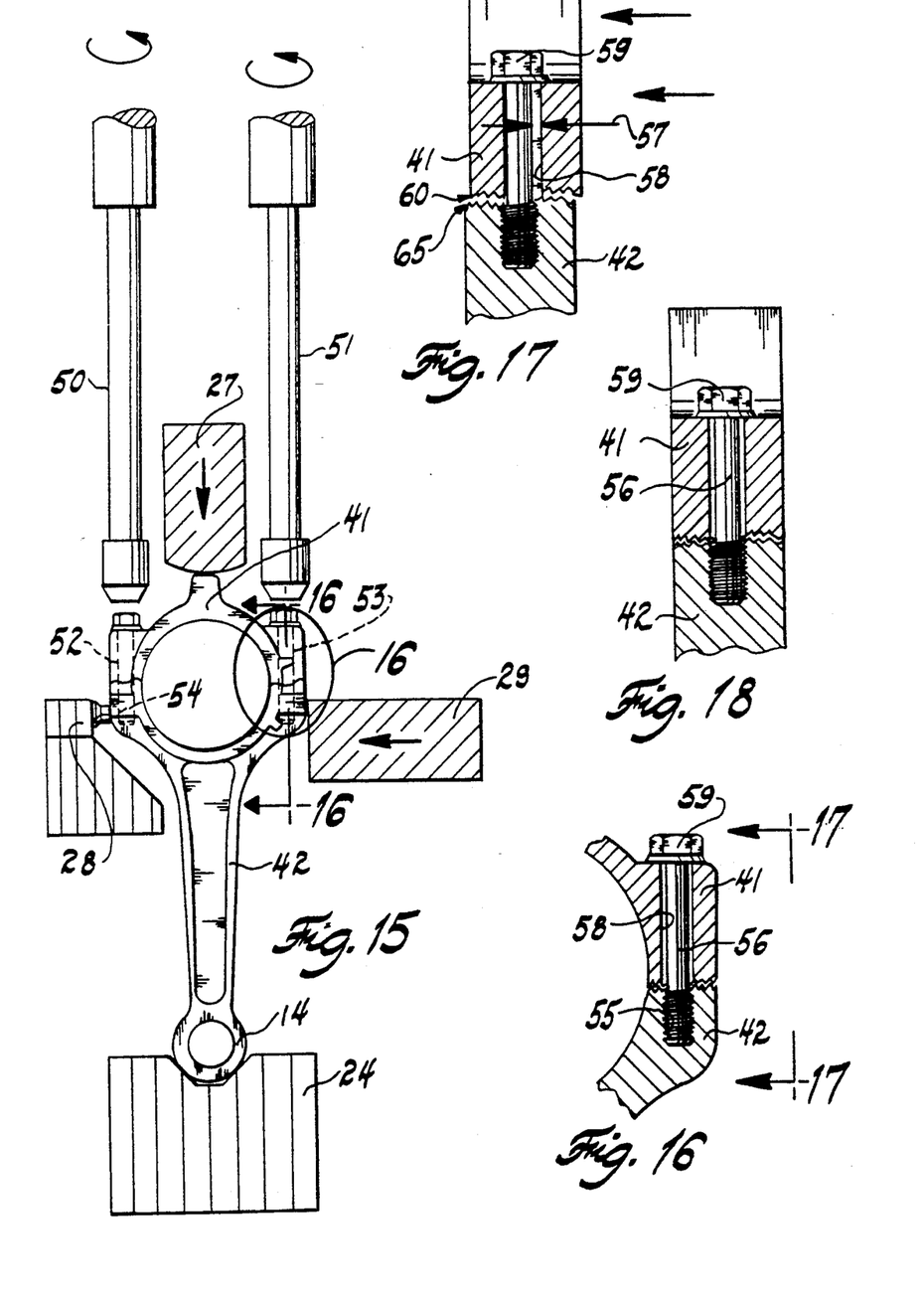
FIG. 15 is an elevational view of a torque machine used to bring the cracked cap and body into its fully mated position.
FIG. 16 is an enlarged view of a circled portion of the rod in FIG. 15.
FIG. 17 is a side of the structure in FIG. 16 taken along lines 17—17 showing degree of guiding provided by the bolts.
FIG. 18 is a view like that of FIG. 17 showing exact realignment after sufficient clamping load is applied.

As shown in FIGS. 15 and 16, the split and separated rod pieces are carried by the fixture 22 (preferably along a carousel) to a remating station. Rotary drivers 50 and 51 are used to torque tie bolts 52 and 53 into threaded seats 54, 55, respectively, in the body portion 42. The unthreaded shank 56 of each bolt has an intended clearance 57 with its cylindrical opening 58 in the cap portion 41 of about 0.27 inch (range of 0.15–0.30 inch).

As the torquing force increases, the bolt heads 59 force the rod cap portion 41 and its cracked surfaces 60 into substantial remating relationship with the ridges 61 within micro-close, but not exact, seating in their corresponding valleys 62 of the cracked surface 63 of the body portion 42. As the cracked surfaces are brought more tightly together, the cap and body portions are free to reshuffle laterally (held only by light spring tension of crowder 27 and support 29) and thus the corresponding ridges of opposite surfaces act as conical guiding surfaces for achieving a more exact rematch. When the torquing force is finally increased to its final level (preferably to within 20% of the yield point of the bolt shank material), any dislocation needed to achieve exact rematch is assured by yielding of the ridges.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making remateable cracked connecting rods comprised of forged wrought steel possessing typical ductility, said rods having a big end with a big bore therein and an arm-like body extending therefrom with a small end at its extremity, the big end having crack initiating crevices formed therein to promote a cracking plane, the method comprising the following steps:
   (a) placing the walls of the big bore of an uncracked connecting rod onto a nestable pair of cantilevered hemispherical blocks complementary to the internal shape of the big bore;
   (b) continuously and uniformly separating the cantilevers of said blocks to initially assure contact of said blocks at a tangent point aligned substantially on the longitudinal axis of the uncracked connecting rod, and thereafter to exert sufficient force through said cantilevers to the blocks to pull apart the connecting rod at a cracking plane determined by said crack initiating crevices, the connecting rod cap and body being free to experience small but independent macro-rotation relative to the connecting rod axis during such cracking separation.

2. The method as in claim 1, in which said separating of the cantilevers is carried out in any plane.

3. The method as in claim 1, in which one of said blocks is maintained stationary and the other is moved to effect said separation.

4. The method as in claim 3, in which the cantilever of said movable block is initially canted away from any anticipated deflection of the cantilever during separation.

5. The method as in claim 4, in which said cantilever of the movable block is canted away from the axis of the big bore an angle in the range of 0.05°–0.15° in the direction of pulling.

6. The method as in claim 1, in which said uncrackable rod is suspended solely by said blocks just prior to initiating cracking.

7. The method as in claim 1, in which said macro-rotation of either of said cracked pieces of the rod is limited by stops coupled to the cantilevered block associated with and in contact with such cracked piece of rod.

8. The method as in claim 7, in which said stops are spaced from the rod piece a distance in the range of 0.02–0.04 inch prior to initiating cracking.

9. The method as in claim 8, in which a pair of stops are associated with the cap of said rod to act as shoulders, and a pair of stops are oriented as cradling surfaces to limit macro-rotation of the small end of the rod piece.

10. The method as in claim 1, in which said continuous and uniform separation movement is promoted by application of a force to at least one of the blocks which is about 46,000 pounds at a movement rate of about 4.5 inches per second.

11. The method as in claim 1, in which said crack initiating crevices are preformed in an unforged metal blank used to make the one-piece rod and thereafter folded generally closed during forging to promote a sharper included angle for such crevices.

12. The method as in claim 1, in which said separation is effected by hydraulic means.

13. The method as in claim 12, in which said hydraulic force is effective to move said block apart at a uniform rate of about 4.5 inches per second.

14. The method as in claim 1, in which only said cantilevered blocks are in a linear path while said cap and body receive longitudinally balanced tension forces while being free to rotate relative to each other a limited amount.

15. A method of making a bipartite connecting rod of forgeable ductile steel, said rod having a big bore, comprising:
   (a) preparing a forged steel one-piece connecting rod with at least one pair of spaced stress riser grooves to define a common cracking plane extending through each side of said rod and bisecting said big bore;
   (b) continuously pulling apart said prepared rod by use of relatively separable cantilevered pull blocks extending into said big bore and having surfaces generally complementary to the internal surfaces of said big bore, said blocks being effective to initially contact the internal surface of said big bore at a pair of tangent points lying on the longitudinal axis of said rod, separated pieces of said rod being free to experience small but independent macro-rotation during such unlimited continuous separation except as inhibited by frictional contact with said blocks; and
   (c) remating said pieces by use of bolts extending therebetween and threaded into one of said pieces, said pieces being free to adjust laterally of the axis of said rod during such remating except as limited by the clearance of the bolt within its unthreaded opening, said bolts being torqued sufficiently to exert a clamping force on the ridges of said cracked plane reshuffling them into substantial rematch and thereafter the clamping force adjusting such ridges to promote exact remating.

16. The method as in claim 15, in which the clearance between the bolt shank and bolt opening is in range of 0.01–0.1 inch and is effective to locate the mating cracked surfaces in a first proximity such that the irregular ridges are effective to guide the cracked surfaces into said substantial rematch upon application of said clamping force.

17. The method as in claim 15, in which the bolts are torqued in a manner to apply a clamping force which is within 20% of the yield point of the bolt shank.

18. The method as in claim 15, in which said stress risers are on the internal surfaces of said big bore.

19. The method as in claim 15, in which there are two pair of said stress risers, the first pair being the internal surface of said big bore and the other pair being on the exterior surfaces of said connecting rod but aligned with said first pair.

* * * * *